(12) United States Patent  (10) Patent No.: US 11,443,185 B2
Huang et al.  (45) Date of Patent: Sep. 13, 2022

(54) MEMORY CHIP CAPABLE OF PERFORMING ARTIFICIAL INTELLIGENCE OPERATION AND METHOD THEREOF

(71) Applicant: Powerchip Semiconductor Manufacturing Corporation, Hsinchu (TW)

(72) Inventors: Frank Chong-Jen Huang, Taipei (TW); Yung-Nien Koh, Taipei (TW)

(73) Assignee: Powerchip Semiconductor Manufacturing Corporation, Hsinchu (TW)

( * ) Notice: Subject to any disclaimer, the term of this patent is extended or adjusted under 35 U.S.C. 154(b) by 552 days.

(21) Appl. No.: 16/548,792

(22) Filed: Aug. 22, 2019

(65) Prior Publication Data

US 2020/0117989 A1  Apr. 16, 2020

Related U.S. Application Data

(60) Provisional application No. 62/744,140, filed on Oct. 11, 2018.

(30) Foreign Application Priority Data

Feb. 27, 2019 (TW) ................... 108106715

(51) Int. Cl.
*G06N 3/08* (2006.01)
*G06F 13/16* (2006.01)
(Continued)

(52) U.S. Cl.
CPC ........... *G06N 3/08* (2013.01); *G06F 12/0862* (2013.01); *G06F 12/0873* (2013.01);
(Continued)

(58) Field of Classification Search
None
See application file for complete search history.

(56) References Cited

U.S. PATENT DOCUMENTS 5,426,757 A  6/1995 Watanabe et al.
5,799,168 A  8/1998 Ban
(Continued)

FOREIGN PATENT DOCUMENTS

CN  108335716  7/2018
JP  H03250244  11/1991
(Continued)

OTHER PUBLICATIONS

"Office Action of Taiwan Counterpart Application", dated Jun. 15, 2020, p. 1-p. 8.
(Continued)

*Primary Examiner* — Charles J Choi
(74) *Attorney, Agent, or Firm* — JCIPRNET

(57) ABSTRACT

A memory chip capable of performing artificial intelligence operation and an operation method thereof are provided. The memory chip includes a memory array, a memory controller, and an artificial intelligence engine. The memory array includes a plurality of memory areas. The memory areas are configured to store digitized input data and weight data. The memory controller is coupled to the memory array via a bus dedicated to the artificial intelligence engine. The artificial intelligence engine accesses the memory array via the memory controller and the bus to obtain the digitized input data and the weight data. The artificial intelligence engine performs a neural network operation based on the digitized input data and the weight data.

18 Claims, 4 Drawing Sheets

(51) Int. Cl.
  *G06F 12/0873* (2016.01)
  *G06F 12/0862* (2016.01)
(52) U.S. Cl.
  CPC ...... *G06F 13/1673* (2013.01); *G06F 13/1678* (2013.01); *G06F 2212/154* (2013.01)

(56) References Cited

U.S. PATENT DOCUMENTS

| | | | |
|---|---|---|---|
| 9,298,654 | B2 | 3/2016 | Fleischer et al. |
| 2010/0215253 | A1 | 8/2010 | Yamamoto et al. |
| 2016/0342892 | A1 | 11/2016 | Ross |
| 2017/0277659 | A1 | 9/2017 | Akerib et al. |
| 2019/0080228 | A1* | 3/2019 | Seth ...................... G06N 3/0472 |
| 2020/0051309 | A1* | 2/2020 | Labbe ....................... G06T 1/20 |
| 2020/0057561 | A1* | 2/2020 | Lai .......................... G06N 3/063 |
| 2020/0243154 | A1* | 7/2020 | Sity ........................ G11C 29/36 |

FOREIGN PATENT DOCUMENTS

| | | |
|---|---|---|
| JP | H045774 | 1/1992 |
| JP | H0415773 | 1/1992 |
| JP | H0467259 | 3/1992 |
| JP | H0520140 | 3/1993 |
| JP | 2008310524 | 12/2008 |
| JP | 2018116469 | 7/2018 |
| JP | 2018521374 | 8/2018 |
| TW | 200639635 | 11/2006 |
| TW | 201626207 | 7/2016 |
| TW | 201818301 | 5/2018 |
| TW | 201830296 | 8/2018 |
| WO | 2008153196 | 12/2008 |
| WO | 2016186810 | 11/2016 |
| WO | 2018139265 | 8/2018 |

OTHER PUBLICATIONS

"Office Action of Japan Counterpart Application", dated Oct. 27, 2020, p. 1-p. 6.

"Office Action of Japan Counterpart Application", dated Mar. 23, 2021, p. 1-p. 3.

* cited by examiner

MEMORY CHIP CAPABLE OF PERFORMING ARTIFICIAL INTELLIGENCE OPERATION AND METHOD THEREOF

CROSS-REFERENCE TO RELATED APPLICATION

This application claims the priority benefits of U.S. provisional application Ser. No. 62/744,140, filed on Oct. 11, 2018, and Taiwan application Ser. No. 108106715, filed on Feb. 27, 2019. The entirety of each of the above-mentioned patent applications is hereby incorporated by reference herein and made a part of specification.

BACKGROUND

1. Field of the Invention

The invention relates to a memory architecture, and more particularly, to a memory chip capable of performing artificial intelligence (AI) operation and an operation method thereof.

2. Description of Related Art

With the evolution of artificial intelligence (AI) operations, the AI operations have been widely applied in neural network operations like image analysis, voice analysis, and natural language processing performed via a neural network model. Further, with the increasing operational complexity of neural networks, computer devices currently used to perform the artificial intelligence operations have gradually failed to provide effective and quick operation performance to cope with current requirements in the neural network operations.

In this regard, a general method for improving the speed of the artificial intelligence operation uses, for example, a FPGA (Field Programmable Gate Array) architecture, an ASIC (Application-Specific Integrated Circuit) architecture, or a GPU (Graphics Processing Unit) architecture to share the relevant tasks with high operational loadings in the neural network operation performed by a CPU (Central Processing Unit) to achieve the effect of accelerated operation. However, as these methods are still limited by the memory wall, their operation performance cannot be significantly improved. In consideration of the above, a solution regarding how to design a processing architecture that can quickly perform the artificial intelligence operation is proposed below with reference to several embodiments.

SUMMARY OF THE INVENTION

The invention provides a memory chip capable of performing artificial intelligence (AI) operation and an operation method thereof, which can directly read digitized input data and weight data stored in the memory chip by an artificial intelligence engine integrated in the memory chip so the artificial intelligence engine can quickly perform a neural network operation.

The memory chip capable of performing artificial intelligence operation of the invention includes a memory array, a memory controller and an artificial intelligence engine. The memory array includes a plurality of memory areas. The memory areas are configured to store digitized input data and weight data. The memory controller is coupled to the memory array via a bus dedicated to the artificial intelligence engine. The artificial intelligence engine is coupled to the memory controller, and accesses the memory array via the memory controller and the bus to obtain the digitized input data and the weight data. The artificial intelligence engine performs a neural network operation based on the digitized input data and the weight data.

In an embodiment of the invention, the memory areas include a plurality of data buffer areas. The artificial intelligence engine and an external processor alternately access the data buffer areas such that when the artificial intelligence engine accesses the digitized input data in one of the data buffer areas of the memory areas, the external processor simultaneously accesses another digitized input data in another one of the data buffer areas.

In an embodiment of the invention, the artificial intelligence engine includes a first cache unit. The artificial intelligence engine pre-reads the digitized input data in one of the data buffer areas of the memory areas by the first cache unit.

In an embodiment of the invention, a bus width of the bus is greater than or equal to a data volume of a whole row of each of a plurality of memory banks of each of the memory areas.

In an embodiment of the invention, a plurality of weight values of the weight data or a plurality of feature values of feature map data are coded with an address and sequentially stored in a plurality of memory banks of each of the memory areas according to an address encoding scheme in combination of row, bank and column. The artificial intelligence engine sequentially and interleavedly reads the corresponding row of the memory banks of each of the memory areas to sequentially obtain the weight values of the weight data or the feature values of the feature map data.

In an embodiment of the invention, the memory areas include a plurality of weight data areas. The artificial intelligence engine sequentially and interleavedly reads a plurality of memory banks of a weight data area of the memory areas to obtain the weight data.

In an embodiment of the invention, the artificial intelligence engine includes a second cache unit. A plurality of cache lines of the second cache unit are configured to pre-read the weight data of the memory banks in pipelining manner. The artificial intelligence engine sequentially reads the weight data stored in the cache lines of the second cache unit to perform the neural network operation.

In an embodiment of the invention, the memory areas include two feature map data areas. The artificial intelligence engine alternately accesses the two feature map data areas. The artificial intelligence engine alternately reads feature map data from a plurality of memory banks of one of the two feature map data areas, and stores another feature map data generated during the neural network operation performed by the artificial intelligence engine in a plurality of memory banks of another one of the two feature map data areas.

In an embodiment of the invention, the artificial intelligence engine includes a third cache unit. A plurality of cache lines of the third cache unit are configured to pre-read the feature map data of the memory banks of one of the two feature map data areas in pipelining manner. The artificial intelligence engine sequentially reads the feature map data stored in the cache lines of the third cache unit to perform the neural network operation.

In an embodiment of the invention, the artificial intelligence engine includes a fourth cache unit. A plurality of cache lines of the fourth cache unit are configured to pre-store the another feature map data generated during the neural network operation performed by the artificial intelligence engine. The feature map data stored in the cache lines of the fourth cache unit is sequentially read in pipelining manner, and stored the feature map data in the memory banks of another one of the two feature map data areas.

The operation method capable of performing artificial intelligence operation of the invention includes steps of: accessing a plurality of memory areas of a memory array via a memory controller and a bus dedicated to an artificial intelligence engine by the artificial intelligence engine to obtain digitized input data and weight data; and performing a neural network operation based on the digitized input data and the weight data by the artificial intelligence engine.

In an embodiment of the invention, the step of obtaining the digitized input data includes: when accessing the digitized input data in one of a plurality of data buffer areas of the memory areas by the artificial intelligence engine, simultaneously accessing another digitized input data in another one of the data buffer areas by an external processor.

In an embodiment of the invention, the step of obtaining the digitized input data includes: pre-reading the digitized input data in one of a plurality of data buffer areas of the memory areas by a first cache unit of the artificial intelligence engine.

In an embodiment of the invention, a bus width of the bus is greater than or equal to a data volume of a whole row of each of a plurality of memory banks of each of the memory areas.

In an embodiment of the invention, a plurality of weight values of the weight data or a plurality of feature values of feature map data are coded with an address and sequentially stored in a plurality of memory banks of each of the memory areas according to an address encoding scheme in combination of row, bank and column. The step of obtaining the weight data or feature map data includes: sequentially and interleavedly reading the corresponding row of the memory banks of each of the memory areas by the artificial intelligence engine to sequentially obtain the weight values of the weight data or the feature values of the feature map data.

In an embodiment of the invention, the step of obtaining the weight data includes: sequentially and interleavedly reading a plurality of memory banks of a weight data area of the memory areas by the artificial intelligence engine to obtain the weight data.

In an embodiment of the invention, the artificial intelligence engine includes a second cache unit. A plurality of cache lines of the second cache unit are configured to pre-read the weight data of the memory banks in pipelining manner. The step of performing the neural network operation includes: sequentially reading the weight data stored in the cache lines of the second cache unit by the artificial intelligence engine to perform the neural network operation.

In an embodiment of the invention, the memory areas include two feature map data areas. The artificial intelligence engine alternately accesses the two feature map data areas. The operation method further includes steps of: alternately reading feature map data from a plurality of memory banks of one of the two feature map data areas by the artificial intelligence engine, and storing another feature map data generated during the neural network operation performed by the artificial intelligence engine in the memory banks of another one of the two feature map data areas.

In an embodiment of the invention, the artificial intelligence engine includes a third cache unit. A plurality of cache lines of the third cache unit are configured to pre-read the feature map data of the memory banks of one of the two feature map data areas in pipelining manner. The step of performing the neural network operation includes: sequentially reading the feature map data stored in the cache lines of the third cache unit by the artificial intelligence engine to perform the neural network operation.

In an embodiment of the invention, the artificial intelligence engine includes a fourth cache unit. A plurality of cache lines of the fourth cache unit are configured to pre-store the another feature map data generated during the neural network operation performed by the artificial intelligence engine. The step of performing the neural network operation includes: sequentially reading the feature map data stored in the cache lines of the fourth cache unit in pipelining manner and storing the feature map data in the memory banks of another one of the two feature map data areas.

Based on the above, the memory chip capable of performing artificial intelligence operation and the operation method thereof can integrate the artificial intelligence engine in the memory chip such that when the artificial intelligence engine performs the neural network operation, the artificial intelligence engine can quickly read the memory banks of the specific memory area of the memory array via the buses dedicated to the artificial intelligence engine with larger width, so as to quickly obtain the digitized input data and the weight data required for performing the neural network operation. As a result, the memory chip capable of performing artificial intelligence operation and the operation method thereof can provide quick artificial intelligence operation performance.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
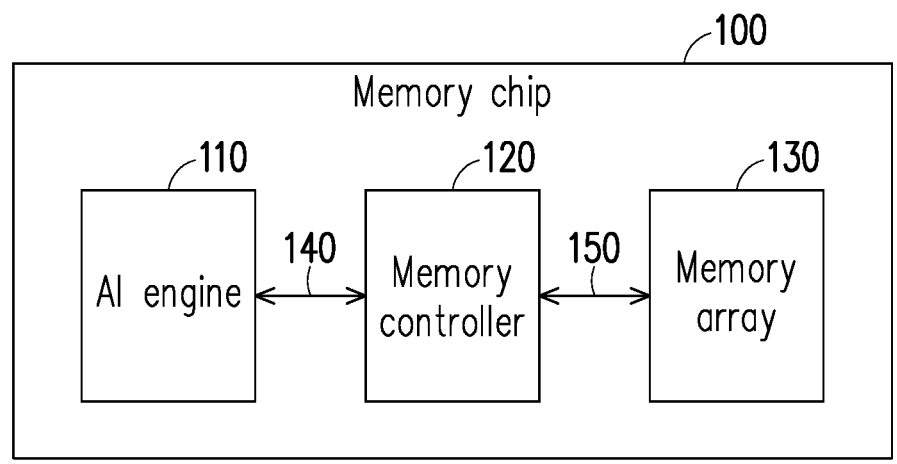
FIG. 1 is a function block diagram of a memory chip according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a function block diagram of a memory chip according to an embodiment of the invention. With reference to FIG. 1, a memory chip 100 includes an artificial intelligence (AI) engine 110, a memory controller 120 and a memory array 130. A data transmission between the artificial intelligence engine 110 and the memory controller 120 is performed via a bus 140, and the memory controller 120 accesses the memory array 130 via a bus 150. In this embodiment, the memory array 130 is divided into a plurality of memory areas, and each of the memory areas includes a plurality of memory banks. Each of the memory areas is configured to store specific data (or dataset). Further, in an embodiment, the memory controller 120 may further include a plurality of dedicated memory control units. The dedicated memory control units correspond to the memory areas in a one-to-one manner to respectively perform a data access action.

In this embodiment, the buses 140, 150 are dedicated to the artificial intelligence engine 110, and a bus width of the buses 140, 150 may be equal to or greater than a data volume of the entire row of each of the memory banks so each time when accessing the memory bank, the buses 140, 150 can access data of the entire row of the memory bank at a time. However, the invention is not limited in this regard. In an embodiment, the bus width of the buses 140, 150 may be correspondingly designed according to an architecture design of the artificial intelligence engine 110 or a data storage format of the memory array 130.

In this embodiment, the artificial intelligence engine 110 may be, for example, a PIM (Processing In Memory) architecture constructed by circuit elements including a control logic unit, an arithmetic logic unit, a cache unit, etc. The artificial intelligence engine 110 may be integrated in a peripheral circuit area of the memory chip 100 to directly access the memory banks of the memory array 130 via the dedicated memory controller 120 and the buses 140, 150. Also, the artificial intelligence engine 110 is designed to have functions for performing neural network operations. In addition, the memory chip 100 of this embodiment may be a DRAM-based (Dynamic Random Access Memory based) chip or a chip designed based on a DRAM chip technology, but the invention is not limited thereto.

In this embodiment, when the artificial intelligence engine 100 performs the neural network operation, the artificial intelligence engine 100 can directly access digitized input data and weight data stored in the memory array 130, and quickly perform the neural network operation according to the digitized input data and the weight data. In addition, the neural network operation in this embodiment may be, for example, a DNN (Deep Neural Network) operation, a CNN (Convolutional Neural Network) operation or a RNN (Recurrent Neural Network) operation, which are not particularly limited by the invention.

Figure 2:
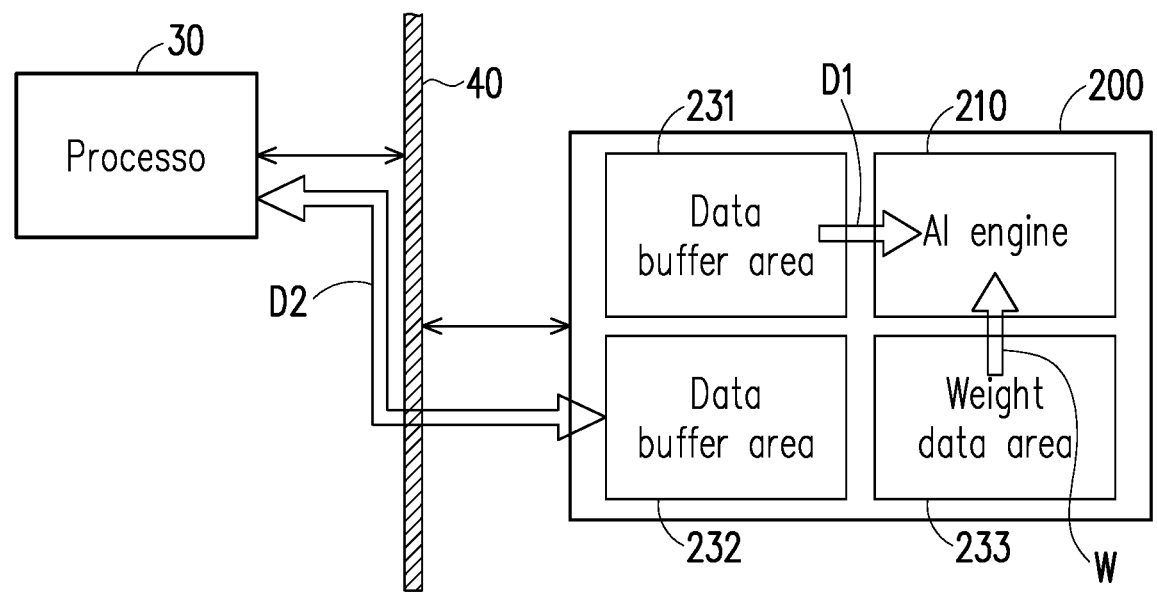
FIG. 2 is an operational architecture diagram of a memory chip according to an embodiment of the invention.

FIG. 2 is an operational architecture diagram of a memory chip according to an embodiment of the invention. With reference to FIG. 2, a memory chip 200 may have the architecture of the memory chip 100 described in the embodiment of FIG. 1. In this embodiment, the memory chip 200 performs a data transmission via a shared memory bus 40 with a processor 30. The memory areas of the memory array of the memory chip 200 are classified into data buffer areas 231, 232 and a weight data area 233, and the data buffer areas 231, 232 and the weight data area 233 respectively corresponds to the different memory banks of the memory array. In other words, the data buffers 231, 232 and the weight data area 233 are individually subjected to an access operation.

In this embodiment, due to limitations by a shared data transmission condition outside the chip, the bus width and the bandwidth of the shared memory bus 40 are limited. However, instead of accessing the memory array via the shared memory bus 40 coupled to the external processor 30, the artificial intelligence engine 210 of this embodiment accesses the data buffer areas 231, 232 and the weight data area 233 via dedicated buses inside the memory chip 200. By doing so, the memory controller 120 of this embodiment can quickly access the memory array 130 according to a specific data access mode.

In this embodiment, the processor 30 may be disposed outside the memory chip 200, and may be, for example, a central processing unit (CPU), or other image signal processors (ISP) for general purpose or special purpose, a microprocessor, a digital signal processor (DSP), a programmable controller, an application specific integrated circuit (ASIC), a programmable logic device (PLD) or other similar processors or a combination of above-mentioned processing circuits.

In the example where the processor 30 is the image signal processor, digitized input data D1, D2 stored into the data buffer areas 231, 232 may be image data, and the artificial intelligence engine 210 is pre-designed with the capability of performing a corresponding specific neural network operation. The artificial intelligence engine 210 can perform a neural network operation on the image data provided by the processor 30 to analyze specific content information in the image data. Therefore, when the artificial intelligence engine 210 performs the neural network operation, the artificial intelligence engine 210 reads the data buffer area 231 and the weight data area 233 to obtain the digitized input data D1 corresponding to the current image data and weight data W required for performing the neural network operation. Meanwhile, the processor 30 stores the digitized input data D2 corresponding to the next image data into the data buffer area 232. Next, after the processor 30 completes the storage operation, the artificial intelligence engine 210 immediately continues to read the digitized input data D2 corresponding to the next image data to proceed the operation, and the processor 30 also immediately turns to update the data into the data buffer area 231.

That is to say, since the processor 30 accesses the data buffer area 232 in the memory array of the memory chip 200 via the shared memory bus 40, while the artificial intelligence engine 210 directly reads the data buffer area 231 via the dedicated bus, instead of performing the access actions sequentially and alternately only after waiting for the other party to complete the access operation, the processor 30 and the artificial intelligence engine 210 can perform respective processing operations parallelly because they do not need to contend for the same bus. In this way, the artificial intelligence engine 210 of this embodiment and the external processor 30 alternately access the data buffer areas 231, 232, so as to quickly and continuously perform the neural network operation while effectively saving the time waiting for the bus to access data.

Figure 3:
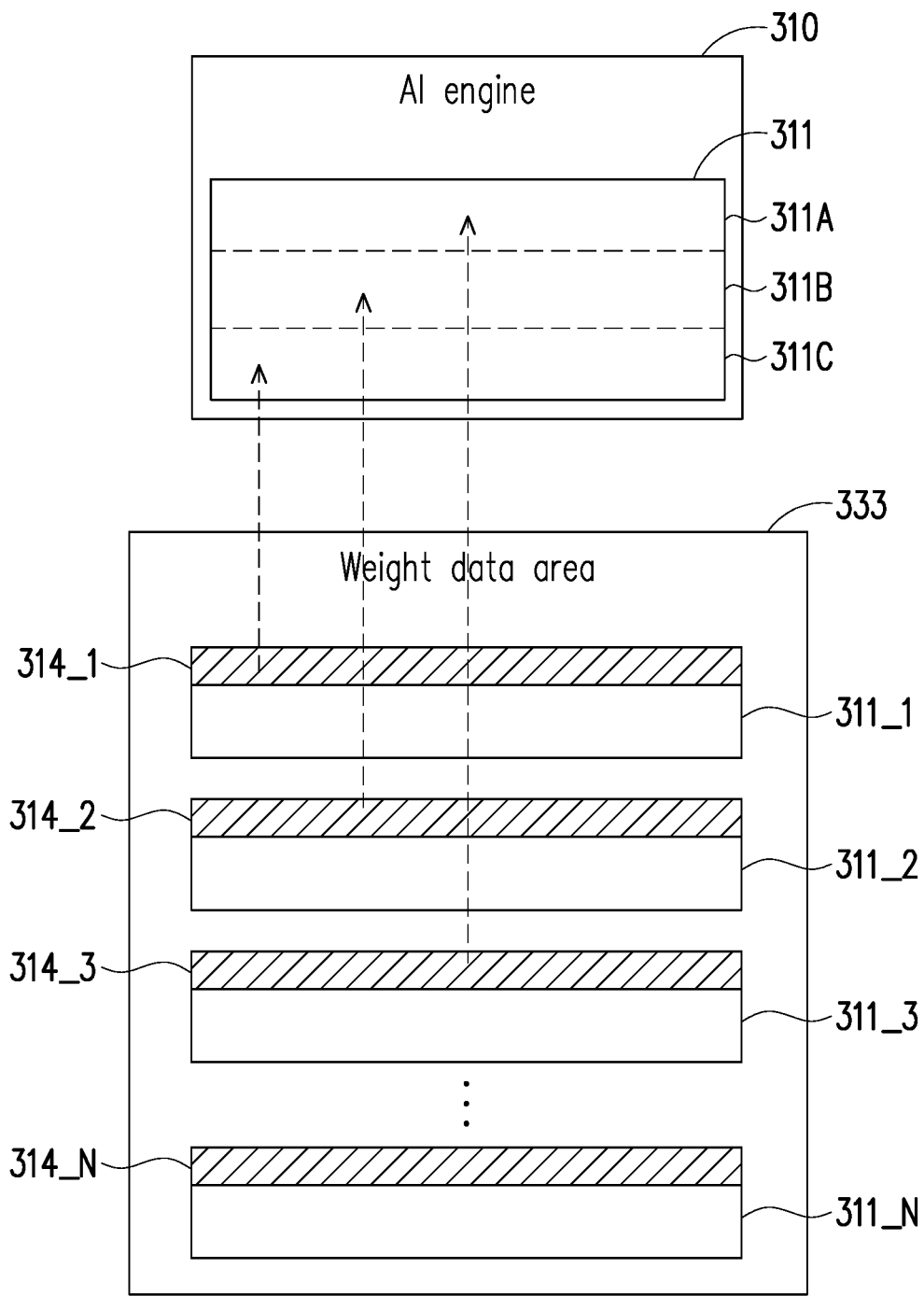
FIG. 3 is a schematic diagram in which an artificial intelligence engine accesses memory area according to an embodiment of the invention.

FIG. 3 is a schematic diagram in which an artificial intelligence engine accesses memory areas according to an embodiment of the invention. With reference to FIG. 3, an artificial intelligence engine 310 includes a cache unit 311. The cache unit 311 includes cache lines 311A to 311C, nonetheless, the number of the cache lines of the cache unit described in each embodiment of the invention is not limited by FIG. 3. A memory area 333 includes memory banks 333_1 to 333_N, wherein N is a positive integer greater than 1. The memory banks 333_1 to 333_N respectively include word line buffers 334_1 to 334_N. In this embodiment, the cache lines 331A to 311C of the cache unit 311 are configured to pre-read the word line buffers 334_1 to 334_N of the memory banks 333_1 to 333_N to obtain data. In this regard, the memory area 333 can, for example, store data required for performing the deep learning network operation or the deep neural network operation including the digitized input data, the weight data or feature map data, and the digitized input data, the weight data or the feature map data are sequentially stored in the memory banks 311_1 to 311_N.

It should be noted that, for a plurality of weight values of the weight data required for the neural network operation and a plurality of feature values of the feature map data, each has a specific access sequence pattern to be read in a neural network model. Therefore, the memory controller can use this sequence nature to store the weight data and the feature map data in an orderly fashion in the memory array to accelerate memory accesses and even cover memory latency. In this regard, as shown by an address encoding scheme in Table 1 below, weight values w0 to w11 of the weight data and feature values f0 to f11 of the feature map data are sequentially placed in continuous address spaces or memory spaces. However, according to the address encoding scheme, the most significant bit part, the intermediate bit part and the less significant bit part in an address coding respectively represent a row address, a bank address and a column address in the physical memory to be accessed. In this way, the memory controller can sequentially store the data in the corresponding column of the corresponding row of the corresponding memory bank of each weight data area according to an order.

With the weight data as an example, each of the consecutive weight values w0 to w11 of the weight data may be coded with an address and sequentially stored in the memory banks 333_1 to 333_3 of the weight data area 333 according to an address encoding scheme in combination of row, bank, and column based on the address encoding scheme in Table 1. It should be noted that, bank addresses 000, 001, and 010 in Table 1 below sequentially correspond to the memory banks 333_1 to 333_3. In this example, according to the address encoding scheme in combination of row, bank, and column, the weight values w0 to w3 are first stored in the consecutive columns (corresponding to column addresses 00, 01, 10 and 11) of the first row (corresponding to a row address 000) of the memory bank 333_1 of the weight data area 333, the weight values w4 to w7 are stored in the consecutive columns (corresponding to the column addresses 00, 01, 10 and 11) of the first row (corresponding to the row address 000) of the memory bank 333_2, and then the weight values w8 to w11 are stored in the consecutive columns (corresponding to the column addresses 00, 01, 10 and 11) of the first row (corresponding to the row address 000) of the memory bank 333_3.

TABLE 1

| Weight value | Feature value | Address encoding scheme | | |
| --- | --- | --- | --- | --- |
| | | Row | Bank | Column |
| w0 | f0 | 000 | 000 | 00 |
| w1 | f1 | 000 | 000 | 01 |
| w2 | f2 | 000 | 000 | 10 |
| w3 | f3 | 000 | 000 | 11 |
| w4 | f4 | 000 | 001 | 00 |
| w5 | f5 | 000 | 001 | 01 |
| w6 | f6 | 000 | 001 | 10 |
| w7 | f7 | 000 | 001 | 11 |
| w8 | f8 | 000 | 010 | 00 |

TABLE 1-continued

| Weight value | Feature value | Address encoding scheme | | |
| --- | --- | --- | --- | --- |
| | | Row | Bank | Column |
| w9 | f9 | 000 | 010 | 01 |
| w10 | f10 | 000 | 010 | 10 |
| w11 | f11 | 000 | 010 | 11 |

In this example, the memory banks 333_1 to 333_3 are individually subjected to the access operation. Therefore, when the artificial intelligence engine 310 performs the neural network operation, based on a memory interleaving access mechanism and according to the order of the corresponding addresses (e.g., the order of the addresses shown in Table 1), the cache unit 311 of the artificial intelligence engine 310 can sequentially read data in a whole row (corresponding to the row address 000 in this example) in the memory banks 333_1 to 333_3 (corresponding the bank addresses 000, 001 and 010) in a pipelining manner, so as to sequentially obtain the weight values w0 to w11 required for performing the neural network operation.

More specifically, the word line buffers 334_1 to 334_3 of the memory banks 333_1 to 333_3 will pre-read data from the entire row (corresponding to the row address 000 in this example) of each of the memory banks 333_1 to 333_3 so the cache lines 311A, 311B and 311C can interleavedly pre-fetch the weight data (the weight values w0 to w11) of the entire row of each of the memory banks 333_1 to 333_3. In other words, the artificial intelligence engine 310 reads the weight data area 333 via the dedicated bus with a larger width and the dedicated memory controller, and the width of the dedicated bus may be equal to or greater than a data volume of a whole row of each of the memory banks 333_1 to 333_N. Then, the artificial intelligence engine 310 sequentially reads the weight data (corresponding to the weight values w0 to w11 of the row address 000 in this example) stored in the cache lines 311A, 311B and 311C of the cache unit 311 to perform the neural network operation.

As another example, when the weight data (the weight values w0 to w11) are interleavedly moved to the cache lines 331A to 331B and sequentially used by the artificial intelligence engine 310, each of the word line buffers 334_4 to 334_6 of the memory banks 333_4 to 333_6 pre-reads data from a whole row of each of the memory banks 333_4 to 333_6 respectively (which are weight values w12 to w23, for example, as in continuation with Table 1). By analogy, the artificial intelligence engine 310 can read the weight data more efficiently and quickly according to the neural network data access pattern, so as to achieve the effect of quickly performing the neural network operation. More importantly, by interleavedly reading the memory banks of the memory area, the artificial intelligence engine 310 of this embodiment can effectively overcome the impacts of tRCD (RAS-to-CAS Delay) time delay and tRP (RAS Precharge Time) time delay.

In addition, the feature map data described in this embodiment may also be stored and read by the same methodology used for the weight data, which is not repeated hereinafter. Moreover, Table 1 is only used to represent the address encoding scheme for a part of the weight data and a part of the feature map data, and the data volume of the weight data and feature map data and the length and the address encoding scheme in the invention are not limited by Table 1.

Figure 4:
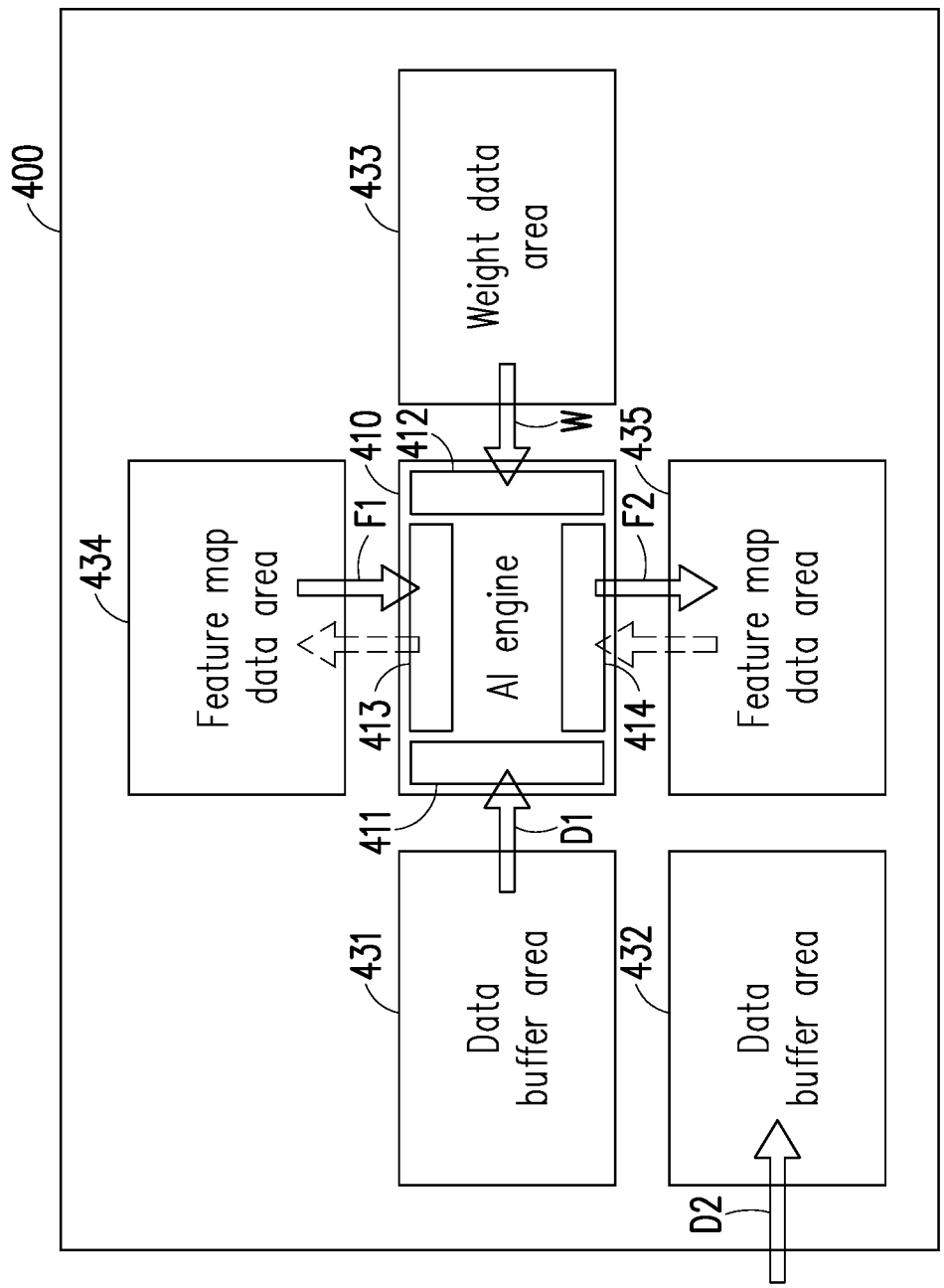
FIG. 4 is an operational architecture diagram of a memory chip according to another embodiment of the invention.

FIG. 4 is an operational architecture diagram of a memory chip according to another embodiment of the invention. With reference to FIG. 4, a memory chip 400 may have the architecture of the memory chip 100 described in the embodiment of FIG. 1. In this embodiment, the memory chip 400 performs a data transmission with an external processor via a shared memory bus. The memory areas of the memory array of the memory chip 400 are classified into data buffer areas 431, 432, a weight data area 433, and feature map data areas 434, 435. In this embodiment, the data buffer areas 431, 432, the weight data area 433, and the feature map data areas 434, 435 respectively correspond to the different memory banks of the memory array. In other words, the data buffer areas 431, 432, the weight data area 433, and the feature map data areas 434, 435 are individually subjected to an access operation.

In this embodiment, an artificial intelligence engine 410 may perform a convolutional neural network operation, for example. The artificial intelligence engine 410 accesses the data buffer areas 431, 432, the weight data area 433, and the feature map data areas 434, 435 via respective dedicated memory controllers and respective dedicated buses. Here, the artificial intelligence engine 410 alternately accesses the feature map data areas 434, 435. For instance, at the very first beginning, after the artificial intelligence engine 410 reads the digitized input data D1 in the data buffer area 431 to perform the convolutional neural network operation, the artificial intelligence engine 410 generates first feature map data F1. The artificial intelligence engine 410 stores the first feature map data F1 in the feature map data area 434. Then, when the artificial intelligence engine 410 performs the next convolution neural network operation, the artificial intelligence engine 410 reads the first feature map data F1 of the feature map data area 434 for the operation, and generates second feature map data F2. The artificial intelligence engine 410 stores the second feature map data F2 in the feature map data area 435. By analogy, the artificial intelligence engine 410 alternately reads the feature map data generated by the previous operation from the memory banks of the feature map data areas 434 or 435, and then stores current feature map data generated during the current neural network operation in the memory banks of the corresponding feature map data areas 435 or 434. Further, in this embodiment, the digitized input data D2 may be simultaneously stored in or read from the data buffer area 432 by the external processor. This implementation is not limited to the convolutional neural network, but is also applicable to other types of networks.

In this embodiment, an artificial intelligence engine 410 may include a plurality of cache units 411 to 414. The cache unit 411 is configured to pre-read the digitized input data D1 in the data buffer area 431 or the digitized input data D2 in the data buffer area 432. The cache unit 412 is configured to pre-read the weight data W in the weight data area 433 in pipelining manner. The cache units 413, 414 are configured to pre-read the feature map data corresponding to the feature map areas 434, 435 in pipelining manner. In other words, the artificial intelligence engine 410 pre-reads the data in pipelining manner by the cache units 411 to 414 so as to accelerate the speed of the neural network operation. It should be noted that, a plurality of weight values of the weight data W may be stored in the memory banks of the weight data area 433 by the same address encoding scheme in Table 1 above, and the cache unit 412 of the artificial intelligence engine 410 sequentially pre-reads the memory banks of the weight data area 433 in pipelining manner according to the same address encoding scheme so as to sequentially obtain the weight values of the weight data W.

A plurality of feature values of the feature map data F1 may be stored in the memory banks of the feature map data area 434 by the same address encoding scheme in Table 1 above, and the cache unit 413 of the artificial intelligence engine 410 sequentially pre-reads the memory banks of the feature map data area 434 in pipelining manner according to the same address encoding scheme so as to sequentially obtain the feature values of the feature map data F1. Also, the artificial intelligence engine 410 sequentially pre-stores the feature map data F2 generated during the neural network operation in the cache unit 414, sequentially reads the feature map data stored in a plurality of cache lines of the cache unit 414 in pipelining manner, and stores the feature map data in the feature map data area 435. In addition, in some embodiments of the invention, the above cache units may also be implemented by using a plurality of queues.

In other words, the artificial intelligence engine 410 of this embodiment alternately reads the previously generated feature map data from the memory banks of the feature map data areas 434, 435 and stores the current feature map data generated during the neural network operation performed by the artificial intelligence engine 410. Therefore, the artificial intelligence engine 410 of this embodiment can quickly obtain the digitized input data D1 and the weight data W. Also, during the neural network operation, the artificial intelligence engine 410 can quickly and continuously access the feature map data areas 434, 435, so as to achieve the effect of quickly performing the neural network operation.

In addition, enough teaching, suggestion, and instruction regarding other internal device features, implementation and related technical features of the memory chip 400 of this embodiment may be obtained according to related descriptions in the foregoing embodiments of FIG. 1 to FIG. 3, which are not repeated hereinafter.

Figure 5:
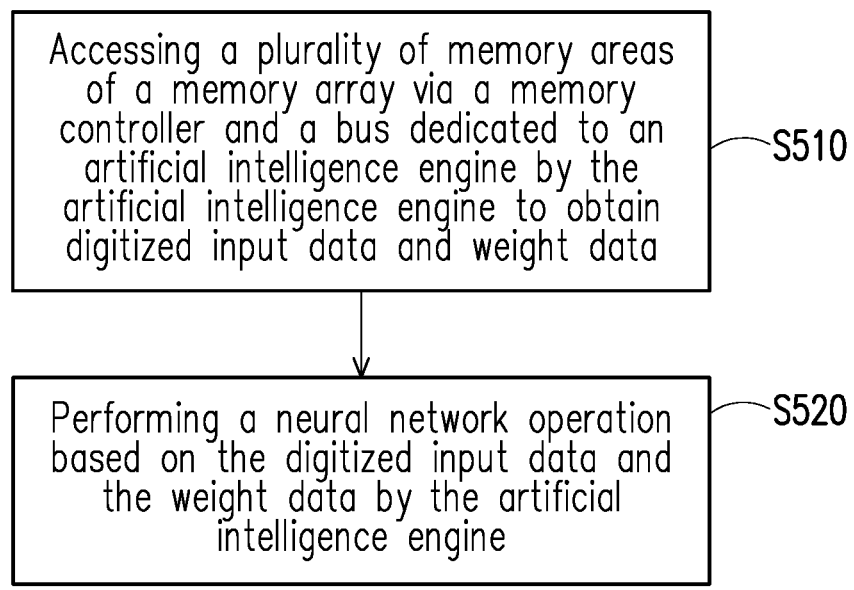
FIG. 5 is a flowchart of an operation method of a memory chip according to an embodiment of the invention.

FIG. 5 is a flowchart of an operation method of a memory chip according to an embodiment of the invention. The operational flow of FIG. 5 is applicable to, for example, the memory chips 100, 200 and 400 of the embodiments of FIGS. 1, 2, and 4. Referring to FIG. 5 and FIG. 1, with the memory chip 100 of FIG. 1 taken as an example, the memory chip 100 can executes steps S510, S520. In step S510, the artificial intelligence engine 110 of the memory chip 100 accesses a plurality of memory areas of the memory array 130 via the memory controller 120 and a bus dedicated to the artificial intelligence engine 110 to obtain digitized input data and weight data. In step S520, the artificial intelligence engine 110 of the memory chip 100 performs a neural network operation based on the digitized input data and the weight data. Accordingly, the operation method of the memory chip in this embodiment can achieve the effect of quickly performing the neural network operation by the artificial intelligence engine 110 integrated in the memory chip 100.

In addition, enough teaching, suggestion, and instruction regarding other internal device features, implementation and related technical features of the memory chip 100 of this embodiment may be obtained according to related descriptions in the foregoing embodiments of FIG. 1 to FIG. 4, which are not repeated hereinafter.

In summary, the memory chip capable of performing artificial intelligence operation and the operation method thereof can integrate the artificial intelligence engine in the memory chip, and can quickly access the memory areas of the memory array via the memory controller and the bus dedicated to the artificial intelligence engine in an operation mode dedicated to the neural network operation. Here, the width of the bus dedicated to the artificial intelligence engine of the invention is not limited by the specification of the external shared bus width and can thus provide higher data transmission performance. Also, the method of accessing the data required for performing artificial intelligence operation can access the data in the memory banks of the corresponding memory area according to the specific address order, so as to effectively overcome impacts of tRCD time delay and tRP time delay. As a result, the memory chip capable of performing artificial intelligence operation and the operation method thereof can provide quick artificial intelligence operation performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory chip capable of performing artificial intelligence operation, comprising:
   a memory array, comprising a plurality of memory areas, wherein the memory areas are configured to store digitized input data and weight data;
   a memory controller, coupled to the memory array via a bus dedicated to an artificial intelligence engine; and
   the artificial intelligence engine, coupled to the memory controller, and configured to access the memory array via the memory controller and the bus to obtain the digitized input data and the weight data,
   wherein the artificial intelligence engine performs a neural network operation based on the digitized input data and the weight data; and
   wherein a bus width of the bus is greater than or equal to a data volume of a whole row of each of a plurality of memory banks of each of the memory areas.

2. The memory chip according to claim 1, wherein the memory areas comprise a plurality of data buffer areas, and the artificial intelligence engine and an external processor alternately access the data buffer areas such that when the artificial intelligence engine accesses the digitized input data in one of the data buffer areas of the memory areas, the external processor simultaneously accesses another digitized input data in another one of the data buffer areas.

3. The memory chip according to claim 1, wherein the artificial intelligence engine comprises a first cache unit, and the artificial intelligence engine pre-reads the digitized input data in one of a plurality of data buffer areas of the memory areas by the first cache unit.

4. The memory chip according to claim 1, wherein a plurality of weight values of the weight data or a plurality of feature values of feature map data are coded with an address and sequentially stored in the plurality of memory banks of each of the memory areas according to an address encoding scheme in combination of row, bank and column, and the artificial intelligence engine sequentially and interleavedly reads the corresponding row of the memory banks of each of the memory areas to sequentially obtain the weight values of the weight data or the feature values of the feature map data.

5. The memory chip according to claim 1, wherein the memory areas comprise a weight data area, and the artificial intelligence engine sequentially and interleavedly reads the plurality of memory banks of the weight data area to obtain the weight data.

6. The memory chip according to claim 5, wherein the artificial intelligence engine comprises a second cache unit, and a plurality of cache lines of the second cache unit are configured to pre-read the weight data of the memory banks in pipelining manner,
   wherein the artificial intelligence engine sequentially reads the weight data stored in the cache lines of the second cache unit to perform the neural network operation.

7. The memory chip according to claim 1, wherein the memory areas comprise two feature map data areas, and the artificial intelligence engine alternately accesses the two feature map data areas,
   wherein the artificial intelligence engine alternately reads feature map data from the plurality of memory banks of one of the two feature map data areas, and stores another feature map data generated during the neural network operation performed by the artificial intelligence engine in the plurality of memory banks of another one of the two feature map data areas.

8. The memory chip according to claim 7, wherein the artificial intelligence engine comprises a third cache unit, and a plurality of cache lines of the third cache unit are configured to pre-read the feature map data of the memory banks of one of the two feature map data areas in pipelining manner,
   wherein the artificial intelligence engine sequentially reads the feature map data stored in the cache lines of the third cache unit to perform the neural network operation.

9. The memory chip according to claim 7, wherein the artificial intelligence engine comprises a fourth cache unit, and a plurality of cache lines of the fourth cache unit are configured to pre-store the another feature map data generated during the neural network operation performed by the artificial intelligence engine,
   wherein the feature map data stored in the cache lines of the fourth cache unit is sequentially read in pipelining manner, and the feature map data is stored into the memory banks of another one of the two feature map data areas.

10. An operation method capable of performing artificial intelligence operation, comprising:
    accessing a plurality of memory areas of a memory array via a memory controller and a bus dedicated to an artificial intelligence engine by the artificial intelligence engine to obtain digitized input data and weight data; and
    performing a neural network operation based on the digitized input data and the weight data by the artificial intelligence engine;
    wherein a bus width of the bus is greater than or equal to a data volume of a whole row of each of a plurality of memory banks of each of the memory areas.

11. The operation method according to claim 10, wherein the step of obtaining the digitized input data comprises:
    when accessing the digitized input data in one of a plurality of data buffer areas of the memory areas by the artificial intelligence engine, simultaneously accessing another digitized input data in another one of the data buffer areas by an external processor.

12. The operation method according to claim 10, wherein the step of obtaining the digitized input data comprises:
    pre-reading the digitized input data in one of a plurality of data buffer areas of the memory areas by a first cache unit of the artificial intelligence engine.

13. The operation method according to claim 10, wherein a plurality of weight values of the weight data or a plurality of feature values of feature map data are coded with an address and sequentially stored in the plurality of memory banks of each of the memory areas according to an address encoding scheme in combination of row, bank and column, and the step of obtaining the weight data or feature map data comprises:

sequentially and interleavedly reading the corresponding row of the memory banks of each of the memory areas by the artificial intelligence engine to sequentially obtain the weight values of the weight data or the feature values of the feature map data.

14. The operation method according to claim 10, wherein the step of obtaining the weight data comprises:

sequentially and interleavedly reading the plurality of memory banks of a weight data area of the memory areas by the artificial intelligence engine to obtain the weight data.

15. The operation method according to claim 14, wherein the artificial intelligence engine comprises a second cache unit, and a plurality of cache lines of the second cache unit are configured to pre-read the weight data of the memory banks in pipelining manner, wherein the step of performing the neural network operation comprises:

sequentially reading the weight data stored in the cache lines of the second cache unit by the artificial intelligence engine to perform the neural network operation.

16. The operation method according to claim 10, wherein the memory areas comprise two feature map data areas, and the artificial intelligence engine alternately accesses the two feature map data areas, wherein the operating method further comprises:

alternately reading feature map data from the plurality of memory banks of one of the two feature map data areas by the artificial intelligence engine, and storing another feature map data generated during the neural network operation performed by the artificial intelligence engine in the memory banks of another one of the two feature map data areas.

17. The operation method according to claim 16, wherein the artificial intelligence engine comprises a third cache unit, and a plurality of cache lines of the third cache unit are configured to pre-read the feature map data of the memory banks of one of the two feature map data areas in pipelining manner, wherein the step of performing the neural network operation comprises:

sequentially reading the feature map data stored in the cache lines of the third cache unit by the artificial intelligence engine to perform the neural network operation.

18. The operation method according to claim 16, wherein the artificial intelligence engine comprises a fourth cache unit, and a plurality of cache lines of the fourth cache unit are configured to pre-store the another feature map data generated during the neural network operation performed by the artificial intelligence engine, wherein the step of performing the neural network operation comprises:

sequentially reading the feature map data stored in the cache lines of the fourth cache unit in pipelining manner, and storing the feature map data into the memory banks of another one of the two feature map data areas.

* * * * *